(12) United States Patent
Lee et al.

(10) Patent No.: US 10,725,213 B2
(45) Date of Patent: Jul. 28, 2020

(54) LENS STRUCTURE FORMED BY MATERIALS IN DIFFERENT REFRACTIVE INDEXES

(71) Applicant: CONCRAFT HOLDING CO., LTD., Grand Cayman (KY)

(72) Inventors: Chin-Hsing Lee, New Taipei (TW); Feng-Cheng Chung, New Taipei (TW); Jie-Ru Chen, New Taipei (TW)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 173 days.

(21) Appl. No.: 16/053,226

(22) Filed: Aug. 2, 2018

(65) Prior Publication Data
US 2019/0302321 A1 Oct. 3, 2019

(30) Foreign Application Priority Data
Apr. 3, 2018 (TW) .............................. 107111721 A

(51) Int. Cl.
| | | |
|---|---|---|
| *G02B 3/04* | (2006.01) | |
| *G02B 9/02* | (2006.01) | |
| *G02B 13/00* | (2006.01) | |
| *G02B 7/02* | (2006.01) | |
| *G02B 3/00* | (2006.01) | |

(52) U.S. Cl.
CPC .............. *G02B 3/04* (2013.01); *G02B 7/027* (2013.01); *G02B 9/02* (2013.01); *G02B 13/005* (2013.01); *G02B 13/006* (2013.01); *G02B 2003/0093* (2013.01)

(58) Field of Classification Search
CPC .......................... G01R 31/396; G01R 31/3646; G01R 31/392; G01R 31/3648; G01R 1/00; H02J 1/00; H02M 1/00
USPC ......................................... 359/642, 708, 717
See application file for complete search history.

(56) References Cited

U.S. PATENT DOCUMENTS

| | | | | |
|---|---|---|---|---|
| 4,897,136 | A * | 1/1990 | Bailey .................... | G02B 5/128 156/145 |
| 6,288,842 | B1 * | 9/2001 | Florczak ................ | G02B 5/128 359/619 |
| 6,841,096 | B2 * | 1/2005 | Quake ............... | B01L 3/502715 264/2.5 |

(Continued)

FOREIGN PATENT DOCUMENTS

TW        I356760 B     1/2012

*Primary Examiner* — Tuyen Tra

(74) *Attorney, Agent, or Firm* — Muncy, Geissler, Olds & Lowe, P.C.

(57) ABSTRACT

A lens structure formed by materials in different refractive indexes includes a transparent sphere in a first refractive index as well as a transparent second lens in a second refractive index. The first refractive index is different from the second refractive index, and the sphere is a round ball formed by a first portion and a second portion which are equipped with a first light condensing effect. The first lens is formed on the first portion of the sphere, the second portion of the sphere is exposed out of the first lens, and the first lens is provided with a first light absorption curve opposite to the first portion of the sphere, so that a light beam can pass through the second portion of the sphere to form the first light condensing effect, and then pass through the first light absorption curve to form a second light condensing effect.

10 Claims, 9 Drawing Sheets

(56) References Cited

U.S. PATENT DOCUMENTS

| | | | |
|---|---|---|---|
| 7,170,688 B2 * | 1/2007 | Handerek | C03C 12/02 359/652 |
| 9,304,280 B2 * | 4/2016 | Gulari | G02B 7/027 |
| 2006/0226560 A1 | 10/2006 | Yu | |

* cited by examiner

LENS STRUCTURE FORMED BY MATERIALS IN DIFFERENT REFRACTIVE INDEXES

BACKGROUND OF THE INVENTION a) Field of the Invention

The present invention relates to a lens structure, and more particularly to a lens structure which is provided with high coaxiality and is formed by materials in different refractive indexes.

b) Description of the Prior Art

The optical lens has been developed gradually from a single lens to a multi-layered lens, in order to satisfy the specific request for light propagation. The multi-layered lenses are utilized to change the optical path, so as to eliminate the optical aberration and the spherical aberration. However, this needs to assemble each lens on a lens holder sequentially and therefore it will be more tedious in assembling and will also waste more space. In addition, to assemble the multi-layered lens, each lens should have high coaxiality to avoid the deviation in the optical axis.

To improve the aforementioned problems, a Taiwanese Invention Patent 1356760 has disclosed a superimposed lens and a manufacturing method and device thereof, including an optical axis, more than one base material and more than one optical heat-resistant colloid layer. Each optical heat-resistant colloid layer includes a colloid layer optically effective circumference, and the axis of the optically effective circumference is superimposed with the optical axis. A center part of each base material includes a base material optically effective circumference. When the surface of the optically effective circumference is attached on the optical heat-resistant colloid layer, the axis of the base material optically effective circumference will be superimposed with the axis of the colloid layer optically effective circumference. The optical heat-resistant colloid layer is first titrated on a mold, and then the base material is attached to the optical heat-resistant colloid layer.

Furthermore, a US Patent Publication No. 20060226560 has disclosed a method for manufacturing a composite lens. First, a base-layer-forming material, a composite-layer-forming material, a base-layer-forming stamper and a composite-layer-forming stamper are provided. Each of the forming stampers is provided with a forming surface. Next, the mounting-type surface is embossed on the composite-layer-forming material using the composite-layer-forming stamper to form a base layer of the composite lens. Then, the forming surface is embossed on the composite-layer-forming material and the composite-layer-forming material is embossed on the base layer of the composite lens using the composite-layer-forming stamper, forming a composite layer of the composite lens.

Accordingly, the composite lens is used to replace the assembly of multi-layered lens, so as to satisfy the requirement of high coaxiality. However, in forming the aforementioned composite lens, the steps are tedious, and it will also need various adhesive materials to increase the adhesive force among the lenses to avoid ablation among the lenses.

Therefore, the technical means and the object thereof to be solved by the present invention are the provision of a lens structure with high coaxiality to replace the multi-layered lens.

SUMMARY OF THE INVENTION

The primary object of the present invention is to provide a lens structure which is provided with high coaxiality and is formed by materials in different refractive indexes.

To achieve the aforementioned object, the present invention discloses a lens structure which is formed by materials in different refractive indexes, comprising a sphere and a first lens. The sphere is transparent and is provided with a first refractive index. The sphere is in a shape of a round ball formed by a first portion and a second portion having a first light condensing effect. The first lens is transparent and is provided with a second refractive index which is different from the first refractive index of the sphere. The first lens is formed on the first portion of the sphere, the second portion of the sphere is protruded out of the first lens, and the first lens is provided with a first light absorption curve opposite to the first portion of the sphere, so that a light beam can pass through the second portion of the sphere to form the first light condensing effect, and then pass through the first light absorption curve to form a second light condensing effect.

In an embodiment, the second portion of the sphere is a convex lens and the first light absorption curve of the first lens is a concave lens.

In an embodiment, the lens structure further comprises a transparent second lens. The second lens is formed on the first lens, opposite to the sphere. In addition, the second lens is provided with a third refractive index which is different from the first refractive index and the second refractive index.

In an embodiment, the second lens is provided with a second light absorption curve which is separated from the first light absorption curve. When the light beam passes through the second light absorption curve, a third light condensing effect is formed.

In an embodiment, the sphere is a glass ball, the first lens is formed on the first portion of the sphere by injection molding to transparent silica gel, and the second lens is formed on the first lens by injection molding to plastic.

To achieve the aforementioned object, the present invention further discloses a lens structure which is formed by materials in different refractive indexes, comprising a sphere, a first lens and a third lens. The sphere is transparent and is provided with a first refractive index. In addition, the sphere is a round ball formed by a first portion and a second portion having a first light condensing effect. The first lens is transparent and is provided with a second refractive index which is different from the first refractive index of the sphere. The first lens is formed on the first portion of the sphere and is provided with a first light absorption curve opposite to the first portion of the sphere. The third lens is transparent and is provided with the same second refractive index as that of the first lens. The third lens is formed on the second portion of the sphere and is opposite to the first lens, so that the sphere is enclosed between the first lens and the third lens. On the other hand, the third lens is provided with a third light absorption curve which is separated from the second portion of the sphere, so that a light beam can pass through the third light absorption curve to form a first light condensing effect, next pass through the second portion of the sphere to form a second light condensing effect, and finally pass through the first light absorption curve of the first lens to form a third light condensing effect.

In an embodiment, the lens structure further comprises a transparent second lens. The second lens is formed on the first lens and is opposite to the sphere. In addition, the second lens is provided with a third refractive index which is different from the first refractive index and the second refractive index.

In an embodiment, the lens structure further comprises a transparent fourth lens. The fourth lens is formed on the third lens and opposite to the sphere. In addition, the fourth lens is provided with the same third refractive index as that of the second lens.

In an embodiment, the second lens is provided with a second light absorption curve which is separated from the first light absorption curve.

In an embodiment, the fourth lens is protruded with a fourth light absorption curve which is separated from the third light absorption curve.

In comparison to the prior arts, the lens structure formed by materials in different refractive indexes, according to the present invention, is provided with following advantages:

1. In the present invention, the lens structure formed by materials in different refractive indexes can replace the conventional multi-layered lens, so as to satisfy the request of high coaxiality and achieve the effect of reducing the space.
2. In the present invention, the sphere in a shape of a round glass ball is used, allowing the entire sphere to form a spherical surface to increase significantly the range of lighting, solve effectively the problem of stray light and improve the light absorption efficiency, thereby reducing the imaging dark region, and solving the problems of astigmatism and optical aberration to improve the imaging quality.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
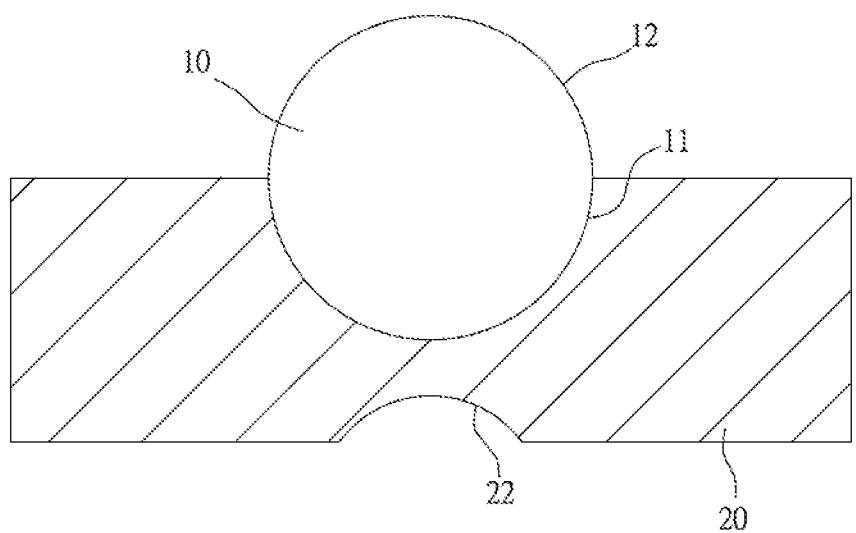
FIG. 1 shows a cutaway view of a first embodiment of the present invention.
Figure 2:
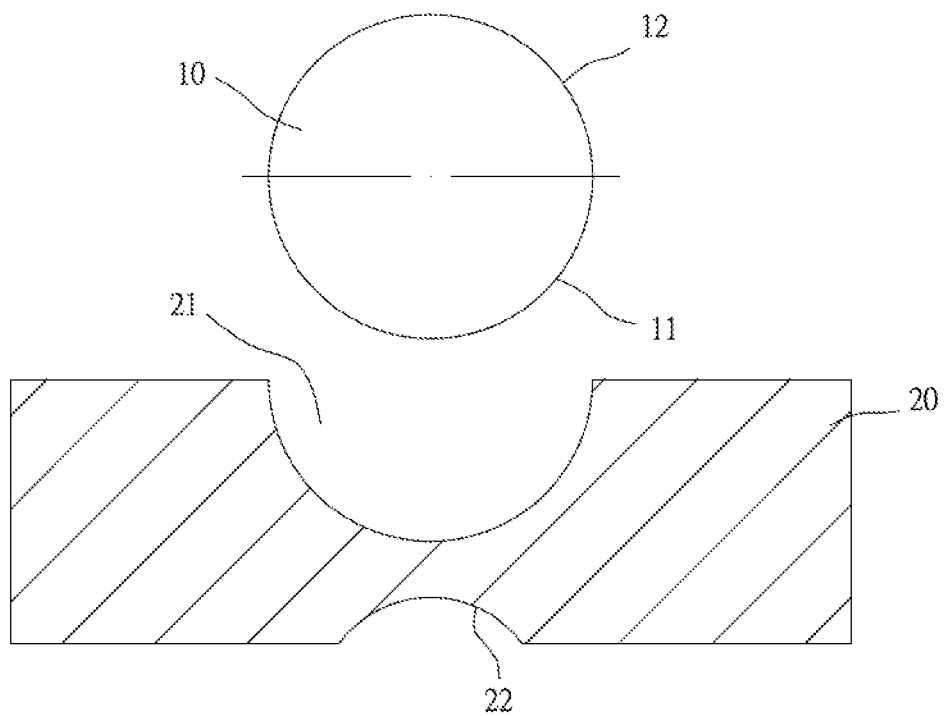
FIG. 2 shows an exploded view of the first embodiment of the present invention.

Referring to FIG. 1 and FIG. 2, it shows a first embodiment provided by the present invention which discloses a lens structure formed by materials in different refractive indexes. The lens structure comprises a sphere 10 and a first lens 20.

Specifically, the sphere 10 is provided with a first portion 11 and a second portion 12 which is connected with the first portion 11 to become an integrated unit. The first portion 11 and the second portion 12 constitute a transparent round ball and the sphere 10 is provided with a first refractive index. The first lens 20 is formed on a side of the sphere 10. In the present embodiment, a first embedding slot 21 is disposed on the first lens 20 in adjacent to the first portion 11 of the sphere 10 to embed the first portion 11, allowing the first portion 11 to be embedded into the first embedding slot 21, so that the second portion 12 of the sphere 10 can be exposed out of the first lens 20, forming a convex lens on the first lens 20. On the other hand, a first light absorption curve 22 is disposed on the first lens 20 opposite to another side of the sphere 10. The first light absorption curve 22 is a concave lens. The first lens 20 is transparent too and is provided with a second refractive index which is different from the first refractive index of the sphere 10. In the present embodiment, the sphere 10 is a glass ball, allowing the whole circumference of the sphere 10 to form a spherical surface. On the other hand, the first lens 20 is formed by transparent silica gel. As the transparent silica gel is transparent and highly adhesive, the first lens 20 can be attached effectively with the sphere 10.

Figure 3:
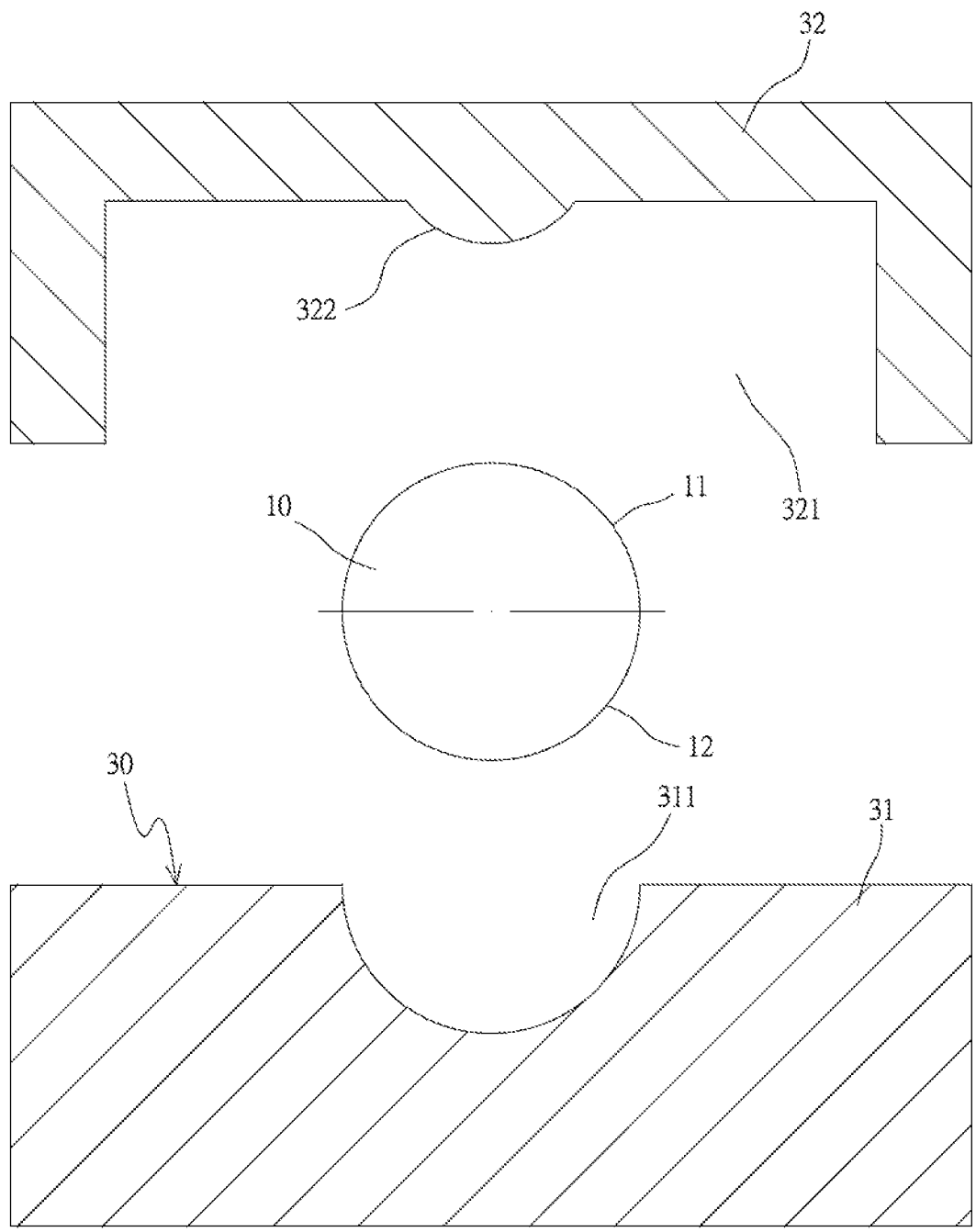
FIG. 3 shows an exploded view of the present invention which is used to produce a mold of a first embodiment.
Figure 4:
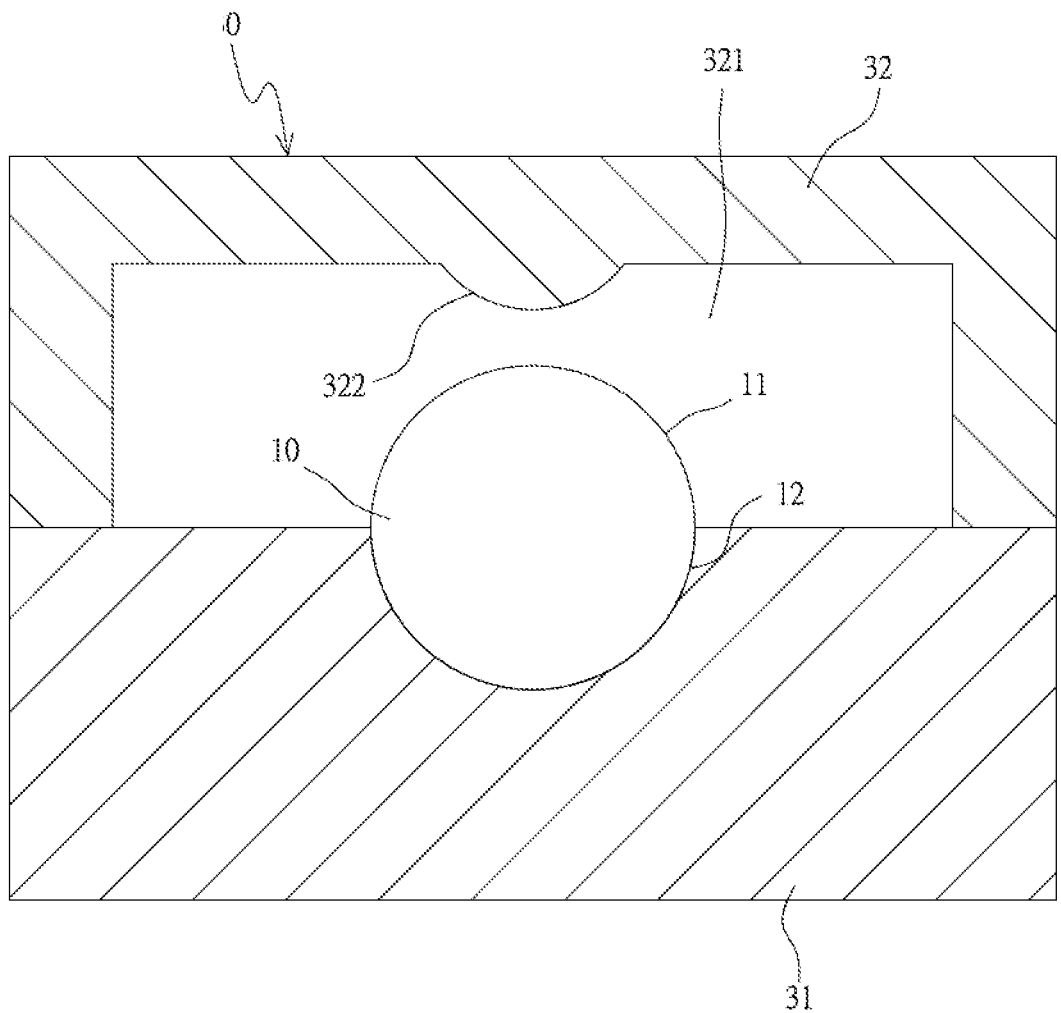
FIG. 4 shows an assembly view of the present invention which is used to produce a mold of the first embodiment.

Referring to FIGS. 2 to 4, in the present embodiment, to form the first lens 20, a mold 30 is provided first. The mold 30 includes a first mold 31 and a second mold 32, and the first mold 31 is provided with a positioning slot 311 to accommodate the second portion 12 of the sphere 10, so that when the second portion 12 of the sphere 10 is disposed in the positioning slot 311, the first portion 11 of the sphere 10 can be exposed out of the first mold 31. On the other hand, the second mold 32 is provided with a forming space 321 opposite to the first mold 31, and an interior of the forming space 321 is formed with a protruded part 322 on a surface opposite to the first mold 31. After the second mold 32 is assembled with the first mold 31, the forming space 321 on the second mold 32 will be closed by the first mold 31, and the first portion 11 of the sphere 10 will be exposed in the forming space 321. Next, transparent silica gel in the liquid state is injected into the forming space 321, and when the transparent silica gel in the liquid state is cooled down and solidified, the first lens 20 can be formed in the forming space 321 and fixed on the first portion 11 of the sphere 10, forming a first embedding slot 21 on an exterior side of the first portion 11 of the sphere 10. In addition, the first light absorption curve 22 will be formed on the protruded part 322, as shown in FIG. 2. Then, the first mold 31 is separated from the second mold 32, and the first lens 20 and the sphere 10 are extracted at a same time, forming the lens structure in the present invention.

Figure 5:
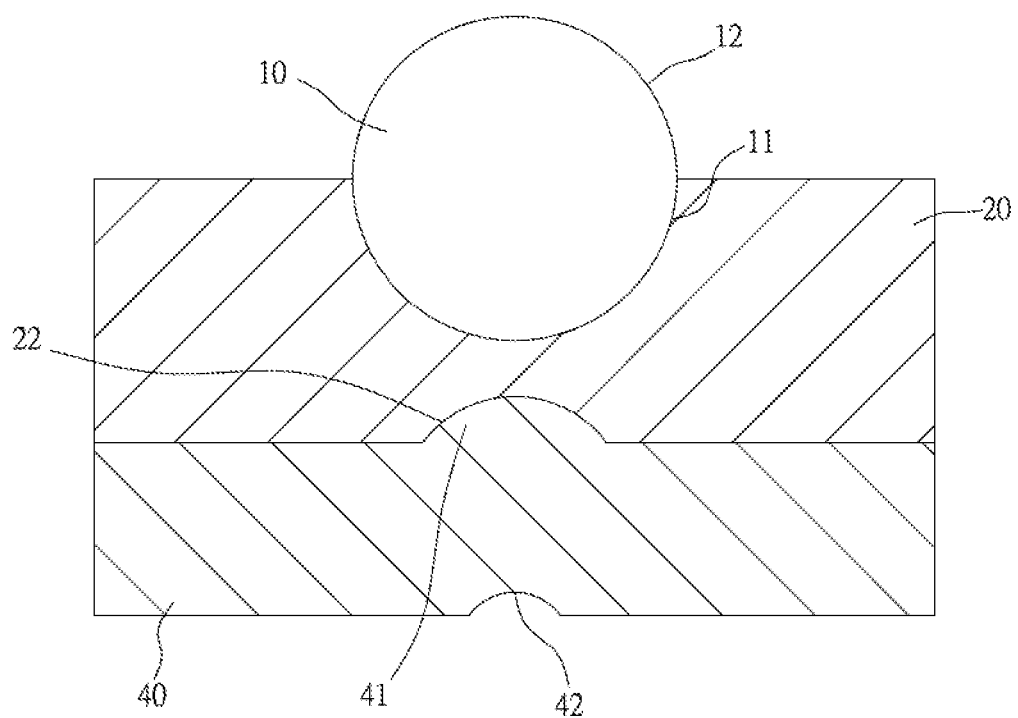
FIG. 5 shows a cutaway view of a second embodiment of the present invention.

Referring to FIG. 2 and FIG. 5, it shows a second embodiment of the present invention. In the present embodiment, the lens structure further comprises a second lens 40 which is disposed on the first lens 20 opposite to the other side of the sphere 10. The second lens 40 is also transparent and is provided with a third refractive index which is different from the first refractive index and the second refractive index. In the present embodiment, the second lens 40 is formed on the first lens 20 by injection molding to transparent plastic. The second lens 40 is provided with a first convex lens 41 which is on a surface in adjacent to the first lens 20 and is embedded in the first light absorption curve 22. In addition, the second lens 40 is also provided with a second light absorption curve 42 on the other surface opposite to the first convex lens 41. The area of the second light absorption curve 42 is a little smaller than that of the first light absorption curve 22, and the second light absorption curve 42 is separated from the first light absorption curve 22. Besides that, the first lens 20 and the second lens 40 in the present invention can be assembled into a cylinder by injection molding.

Figure 6:
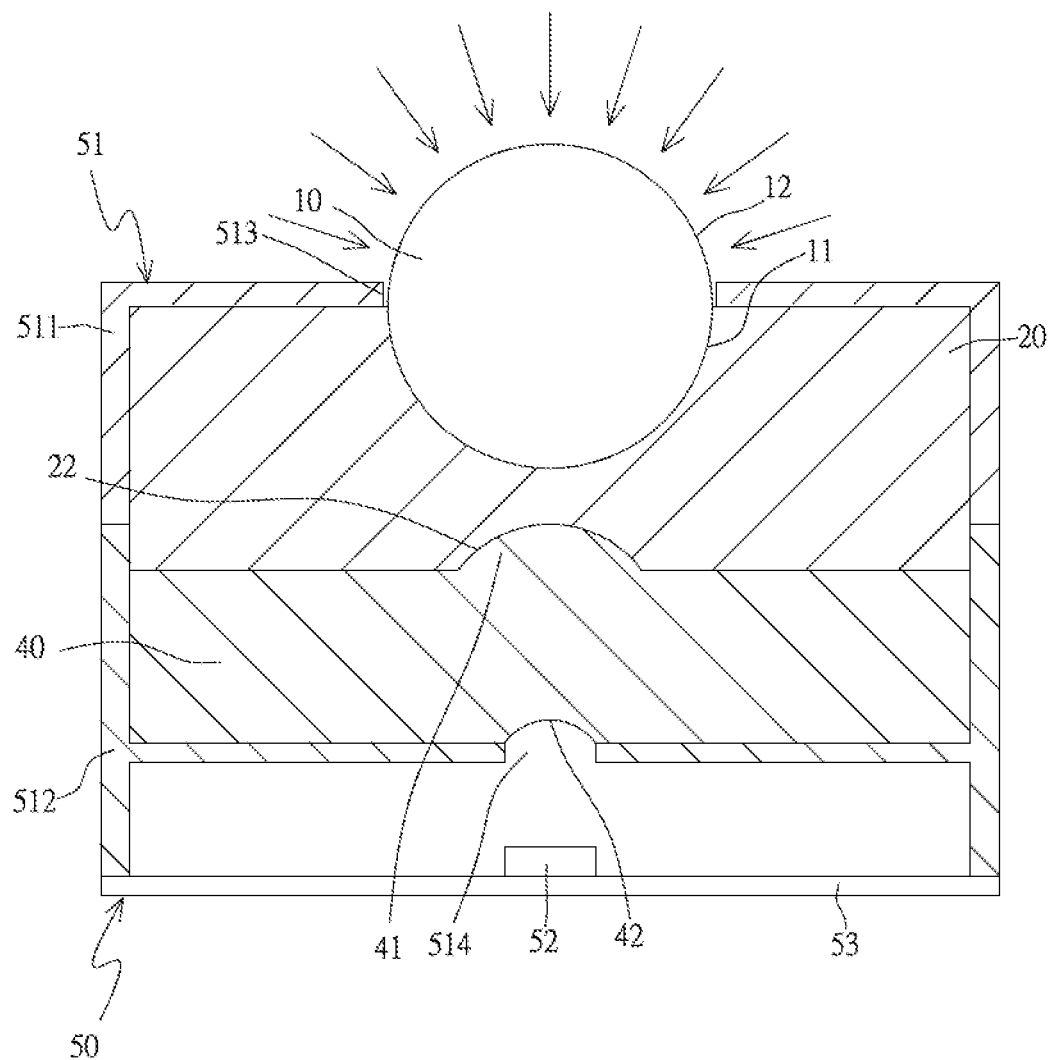
FIG. 6 shows a cutaway view of the second embodiment of the present invention which is applied to a photography module.

Referring to FIG. 5 and FIG. 6, the second embodiment of the present invention is applied to a photography module 50. The photography module 50 includes a lens base 51, an image sensing module 52 and a circuit board 53. The lens base 51 includes a first base 511 and a second base 512 which is assembled on the first base 511. A collecting space is formed between the first base 511 and the second base 512, and the first lens 20 and the second lens 40 are directly disposed in the collecting space as a cylinder. Therefore, the first lens 20 and the second lens 40 can be quickly assembled in the lens base 51. On the other hand, the first base 511 is provided with an incident hole 513 for transfixing the second portion 12 of the sphere 10. The second portion 12 is exposed out of the first base 511 through the incident hole 513. The second base 512 is provided with a receiving hole 514 in adjacent to the second light absorption curve 42. The image sensing module 52 is disposed below the receiving hole 514 and is connected electrically on the circuit board 53.

Accordingly, as the second portion 12 of the sphere 10 is a spherical surface and is exposed out of the lens base 51, when a light beam passes through the second portion 12 of the sphere 10 from an exterior side of the lens base 51, the range of lighting outside the lens base 51 can be increased by the second portion 12. Moreover, when the light beam passes through the second portion 12, a first light condensing effect will be formed. The light beam will then pass through the sphere 10 to enter the first lens 20, followed by passing through the first lens 20 and then the first light absorption curve 22, which forms a second light condensing effect after the light beam passes through the first light absorption curve 22. Next, the light beam will enter the second lens 40. After passing through the second lens 40, the light beam will pass through the second light absorption curve 42 to form a third light condensing effect, and then pass through the receiving hole 514 to enter the image sensing module 52 after passing through the second light absorption curve 42, thereby solving the problem of stray light effectively, increasing the light absorption efficiency, reducing the imaging dark region and improving the imaging quality.

Moreover, as the first lens 20 and the second lens 40 are formed sequentially on the sphere 10 by injection molding, the machining accuracy of the mold (not shown in the drawings) can be utilized to control the coaxiality among the sphere 10, the first lens 20 and the second lens 40 more effectively, thereby satisfying the request of high coaxiality for the multi-layered lens. In addition, as the first lens 20 and the second lens 40 are formed on the sphere 10 by injection molding to the transparent materials in different refractive indexes, the volume of the photography module 50 can be reduced effectively, achieving the effect of reducing the space of the photography module 50.

Figure 7:
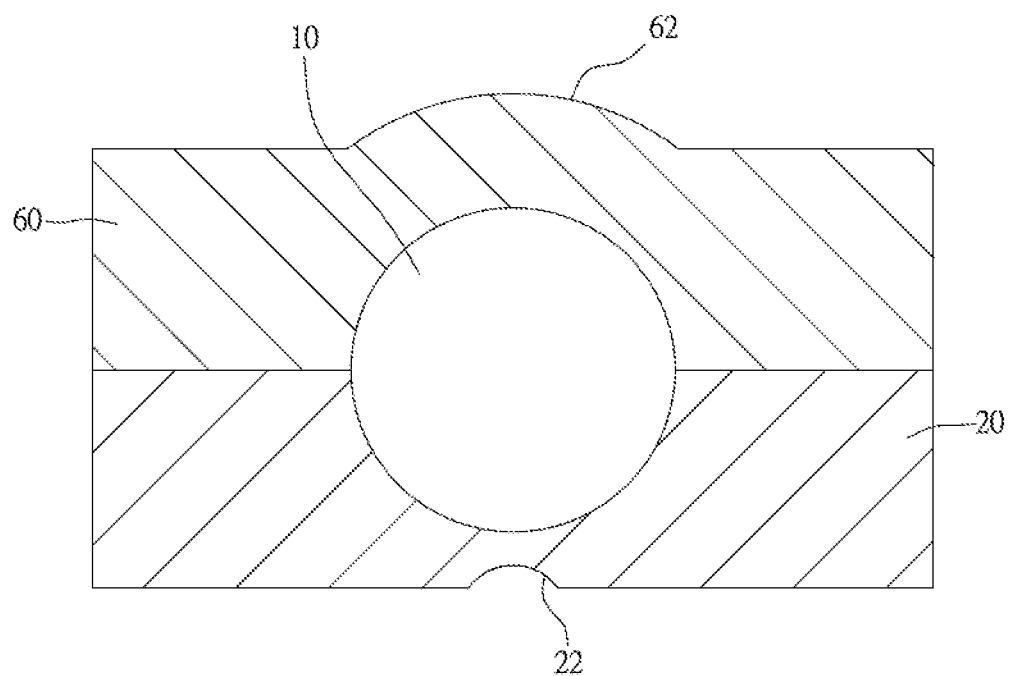
FIG. 7 shows a cutaway view of a third embodiment of the present invention.
Figure 8:
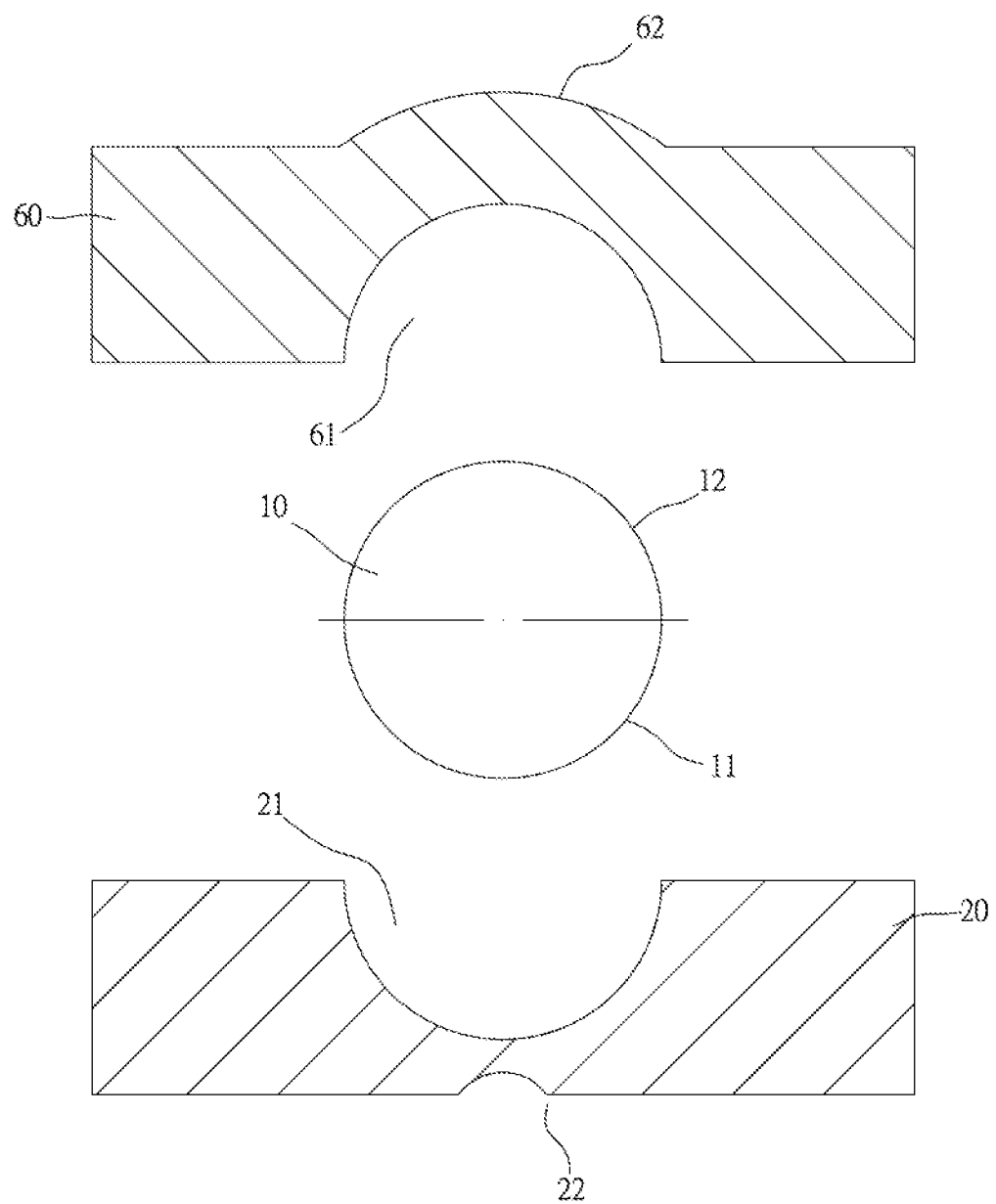
FIG. 8 shows an exploded view of the third embodiment of the present invention.

Referring to FIG. 7 and FIG. 8, it shows a third embodiment of the present invention. In the present embodiment, the lens structure is formed by the sphere 10, the first lens 20 and a third lens 60. The third lens 60 is disposed on the second portion 12 of the sphere 10 and is opposite to the first lens 20, so that the sphere 10 can be enclosed between the first lens 20 and the third lens 60. On the other hand, the third lens 60 is provided with a second embedding slot 61 on a surface in adjacent to the first lens 20, with the second embedding slot 61 being opposite to the first embedding slot 21 of the first lens 20 and providing for embedding the second portion 12 of the sphere 10. In addition, the third lens 60 is also formed with a third light absorption curve 62 on another surface away from the first lens 20. The third light absorption curve 62 is a convex lens and is separated from the second portion 12 of the sphere 10. The first lens 20 and the third lens 60 are all formed by injection molding to transparent silica gel, so that the first lens 20 and the third lens 60 can be provided with the same second refractive index. The first lens 20 and the third lens 60 are assembled into a cylinder. It is definitely that in practical applications, the first lens 20 and the third lens 60 can be also made of transparent materials in different refractive indexes, so that the sphere 10, the first lens 20 and the third lens 60 can be provided with different refractive indexes.

Figure 9:
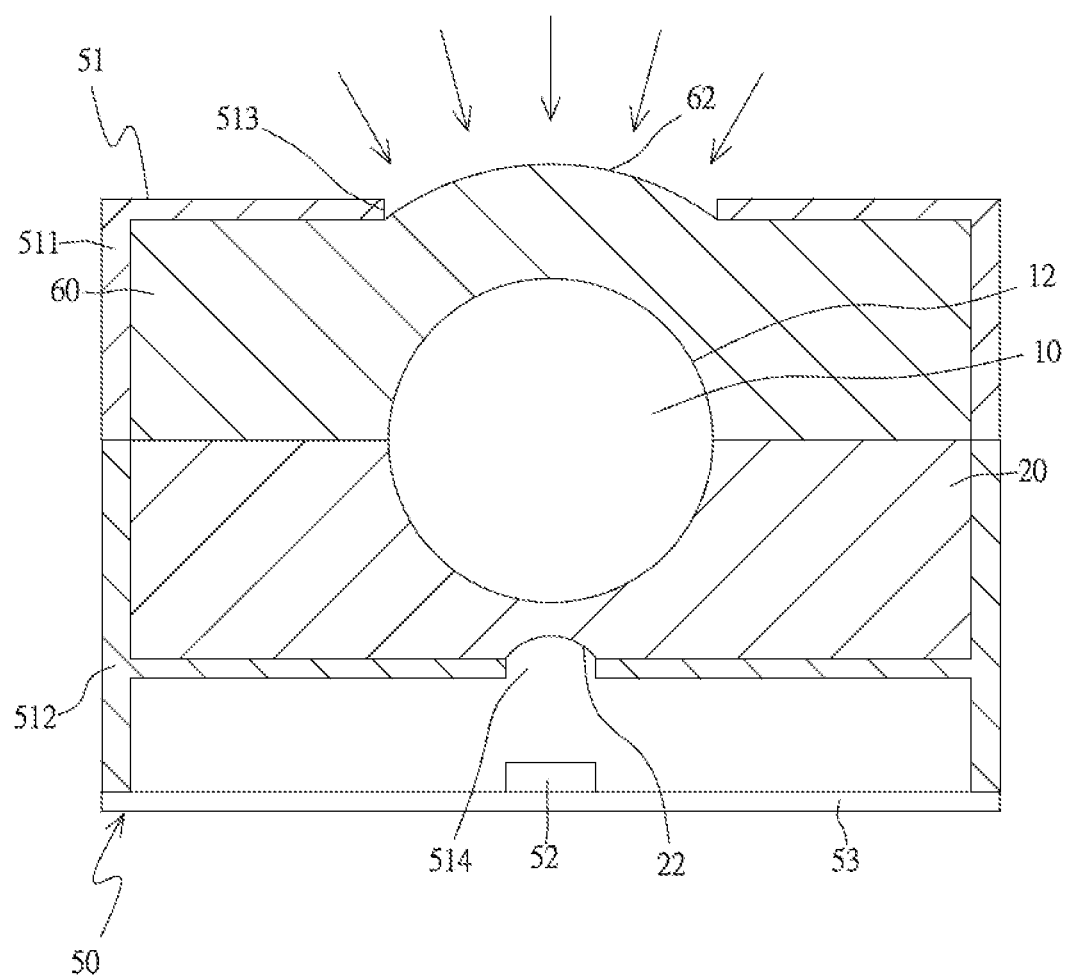
FIG. 9 shows a cutaway view of the third embodiment of the present invention which is applied to the photography module.

Therefore, as shown in FIG. 9, when the third embodiment of the present invention is applied to the photography module 50, the first lens 20 and the third lens 60 that are assembled into the cylinder are installed in the lens base 51, allowing the third light absorption curve 62 of the third lens 60 to pass through the incident hole 513 and to be exposed out of the lens base 51; whereas, the first light absorption curve 22 of the first lens 20 is in adjacent to the receiving hole 514, allowing the first light absorption curve 22 to be in adjacent to the image sensing module 52. When a light beam passes through the third light absorption curve 62 from an outside of the lens base 51, a first light condensing effect will be formed. When the light beam passes through the third lens 60, a second light condensing effect will be formed by the second portion 12 of the sphere 10, and then the light beam will enter the sphere 10 again. After passing through the sphere 10, the light beam will pass through the first lens 20 again, and pass through the first light absorption curve 22 to form a third light condensing effect. Finally, the light beam will pass through the receiving hole 514 to enter the image sensing module 52. It will also solve the problem of stray light effectively, increase the light absorption efficiency, reduce the imaging dark region, and solve the problems of astigmatism and optical aberration, thereby improving the imaging quality.

Figure 10:
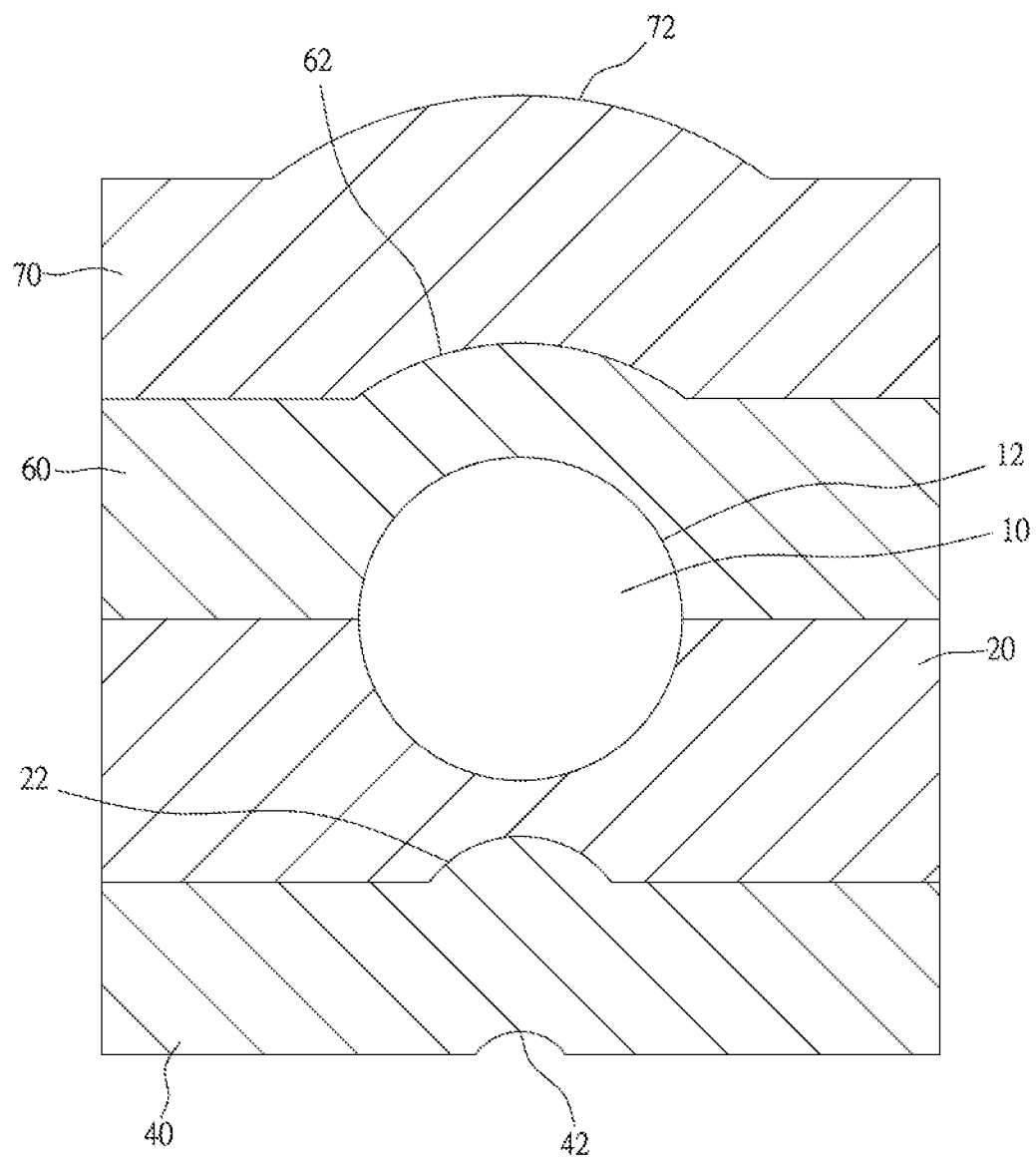
FIG. 10 shows a cutaway view of a fourth embodiment of the present invention.

Finally, as shown in FIG. 10, it shows a fourth embodiment of the present invention. In the present embodiment, the lens structure is formed by the sphere 10, the first lens 20, the second lens 40, the third lens 60 and a fourth lens 70, wherein the sphere 10 is enclosed between the first lens 20 and the third lens 60, the second lens 40 is in adjacent to the first lens 20 and is opposite to the sphere 10, and the fourth lens 70 is in adjacent to the third lens 60 and is opposite to the sphere 10. In the present embodiment, the sphere 10 is formed by transparent glass, the first lens 20 and the third lens 60 are formed by injection molding to transparent silica gel, and the second lens 40 and the fourth lens 70 are formed by injection molding to transparent plastic. In addition, the first lens 20, the second lens 40, the third lens 60 and the fourth lens 70 are assembled into a cylinder.

In the present embodiment, the fourth lens 70 is protruded with a fourth light absorption curve 72. Therefore, when a light beam passes through the fourth light absorption curve 72 of the fourth lens 70, the light beam will form a first light condensing effect, allowing the light beam to pass through the fourth lens 70, forming a second light condensing effect through the third light absorption curve 62 of the third lens 60. On the other hand, when passing through the second portion 12 of the sphere 10 to enter the sphere 10, the light beam will pass through the second portion 12 to form a third light condensing effect, followed by entering the first lens 20 and forming a fourth light condensing effect using the first light absorption curve 22 of the first lens 20. Finally, the light beam will pass through the second light absorption curve 42 of the second lens 40 to form a fifth light condensing effect. Accordingly, by the sphere 10, the first lens 20, the second lens 40, the third lens 60 and the fourth lens 70 formed by materials in different refractive indexes, a wide angle and a light absorption effect can be achieved, which in turn reduces the imaging dark region, and solve the problems of astigmatism and optical aberration, thereby improving the imaging quality.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A lens structure formed by materials in different refractive indexes, comprising a sphere and a first lens, wherein the sphere is transparent, is provided with a first refractive index, and is a round ball formed by a first portion and a second portion which are equipped with a first light condensing effect; and the first lens is transparent and is provided with a second refractive index which is different from the first refractive index of the sphere, with that the first lens is formed on the first portion of the sphere, the second portion of the sphere is protruded out of the first lens, and the first lens is provided with a first light absorption curve opposite to the first portion of the sphere, forming a first light condensing effect when a light beam passes through the second portion of the sphere, and next forming a second light condensing effect when the light beam passes through the first light absorption curve.

2. The lens structure formed by materials in different refractive indexes, according to claim 1, wherein the second portion of the sphere is a convex lens, and the first light absorption curve of the first lens is a concave lens.

3. The lens structure formed by materials in different refractive indexes, according to claim 2, further comprising a transparent second lens, wherein the second lens is formed on the first lens opposite to the sphere, and is provided with a third refractive index which is different from the first refractive index and the second refractive index.

4. The lens structure formed by materials in different refractive indexes, according to claim 3, wherein the second lens is provided with a second light absorption curve which is separated from the first light absorption curve, forming a third light condensing effect when a light beam passes through the second light absorption curve.

5. The lens structure formed by materials in different refractive indexes, according to claim 3, wherein the sphere is a glass ball, the first lens is formed on the first portion of the sphere by injection molding to transparent silica gel, and the second lens is formed on the first lens by injection molding to transparent plastic.

6. A lens structure formed by materials in different refractive indexes, comprising a sphere, a first lens and a third lens, wherein the sphere is transparent, is provided with a first refractive index, and is a round ball formed by a first portion and a second portion which are equipped with a first light condensing effect; the first lens is transparent and is provided with a second refractive index which is different from the first refractive index of the sphere, with that the first lens is formed on the first portion of the sphere, and is provided with a first light absorption curve opposite to the first portion of the sphere; and the third lens is transparent and is provided with the same second refractive index as that of the first lens, with that the third lens is formed on the second portion of the sphere opposite to the first lens that the sphere is enclosed between the first lens and the third lens, and the third lens is provided with a third light absorption curve which is separated from the second portion of the sphere, forming a first light condensing effect when a light beam passes through the third light absorption curve, next forming a second light condensing effect when the light beam passes through the second portion of the sphere, and finally forming a third light condensing effect when the light beam passes through the first light absorption curve of the first lens.

7. The lens structure formed by materials in different refractive indexes, according to claim 6, further comprising a transparent second lens, wherein the second lens is formed on the first lens opposite to the sphere, and is provided with a third refractive index which is different from the first refractive index and the second refractive index.

8. The lens structure formed by materials in different refractive indexes, according to claim 6, further comprising a transparent fourth lens, wherein the fourth lens is formed on the third lens opposite to the sphere, and is provided with the same third refractive index as that of the second lens.

9. The lens structure formed by materials in different refractive indexes, according to claim 8, wherein the second lens is provided with a second light absorption curve which is separated from the first light absorption curve.

10. The lens structure formed by materials in different refractive indexes, according to claim 8, wherein the fourth lens is protruded with a fourth light absorption curve which is separated from the third light absorption curve.

* * * * *